UNITED STATES PATENT OFFICE.

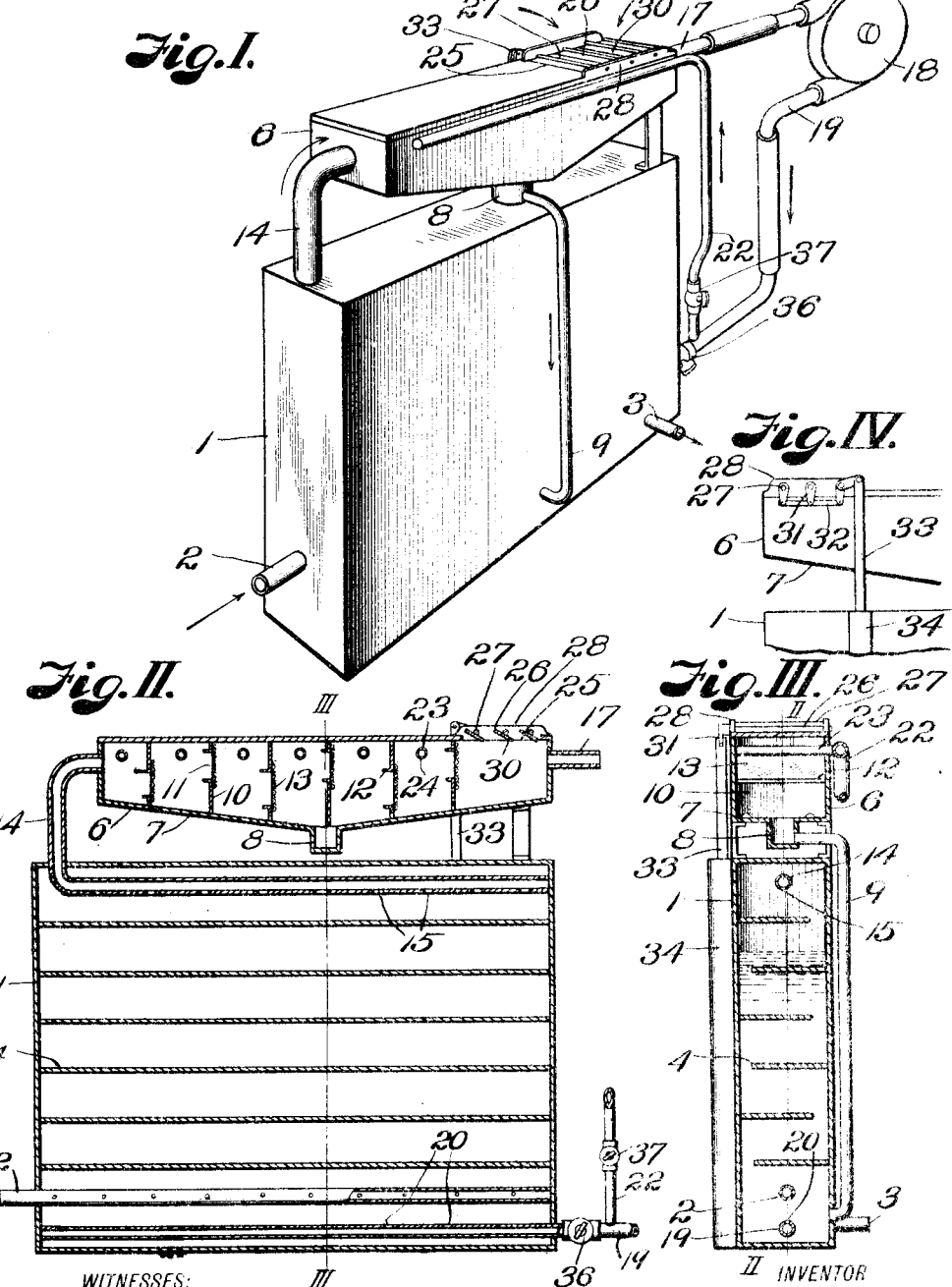

GEORGE L. SCHOFIELD, OF KANSAS CITY, MISSOURI.

CONDENSER.

1,186,847.  Specification of Letters Patent.  Patented June 13, 1916.

Application filed March 7, 1914. Serial No. 823,093.

*To all whom it may concern:*

Be it known that I, GEORGE L. SCHOFIELD, a citizen of the United States, residing at Kansas City, in the county of Jackson and State of Missouri, have invented certain new and useful Improvements in Condensers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to condensers, and more particularly to a condenser for use in connection with a device for cooling the water used in the water jacket of an ordinary explosion engine; the principal object of the invention being to provide means for condensing steam generated in a tank, or the like, forming part of the cooling device, to obviate loss of the circulating water on account of overflow or escape of the water in the form of steam. In accomplishing this object, I have provided the improved details of structure hereinafter described and illustrated in the accompanying drawings, wherein:—

Figure I is a perspective view of a condenser constructed according to my invention, and illustrating its combination with a cooling device. Fig. II is a longitudinal vertical section of the same on the line II—II, Fig. III; the pump being omitted. Fig. III is a transverse, vertical section on the line III—III, Fig. II. Fig. IV is a side elevation of part of the cooling device, showing the damper on the tank, and its connection with a thermostat.

Referring more in detail to the parts:—1 designates a tank, which forms a part of the cooling device, and has an intake pipe 2 and exhaust pipe 3 leading from and to the jacket of an engine, to provide circulation of a cooling fluid between the cooling device and jacket; the intake pipe 2 being preferably located near the bottom of the tank, in order that relatively hot fluid delivered thereto from the engine may enter the tank at the bottom and rise over and about the baffle plates 4 therein.

Supported on the top of the tank is a condenser 6, comprising a casing having a sloping bottom 7 terminating in a well 8, having an outlet pipe 9, whereby water of condensation is collected in the well and conducted therefrom to the bottom of the tank.

Baffles 10 are arranged at intervals throughout the interior of the condenser, and preferably comprise metal plates that extend entirely across the condenser chamber and are provided with openings 11; the openings in successive plates being in staggered relation, to form a tortuous path through the condenser, and the plates at the edges of the openings being provided with lips 12 that serve to retard the steam as it approaches the baffle openings. I preferably cover each of said openings with a screen 13, which serves to retard the flow of steam, and affords greater opportunity for the cooling action.

Leading from the intake end of the condenser is a pipe 14, which projects through the top of the tank and extends within the upper portion of the same; the part of the pipe located within the tank having apertures 15 at the bottom through which steam generated within the tank may enter the pipe and be conducted to the condenser; the location of the apertures 15 in the bottom of the pipe insuring against the flow of cooling fluid into the intake pipe and delivery thereof to the condenser with the steam. The opposite end of the condenser has a pipe 17 leading to an air pump 18, of any suitable type, having an exhaust pipe 19 leading into the lower portion of the tank and extending therethrough; the portion of the pipe within the tank having openings 20 therein through which air from the pump may be delivered to the bottom of the tank to circulate through and agitate the cooling fluid therein, to exert a cooling effect thereon.

Opening from the pump outlet pipe 19 is a branch 22, which extends along the side of the condenser and is provided with subbranches 23 that lead into the subchambers that are formed by the baffle plates within the condenser; the subbranches being provided with apertures 24 through which air from the pump is delivered in jets into steam flowing through the condenser.

It is apparent that the cooling effect of the blower is proportional to the amount of free air which it delivers to the cooling device, and to regulate and automatically control the temperature of the cooling fluid I provide the condenser with an opening 25 adjacent its delivery end, which is controlled by a damper 26, preferably comprising rods 27, which are journaled in extensions 28 on the sides of the condenser casing, at the end adjacent the pump, and extend transversely across the opening 25.

Each of the rods carries a damper plate 30, which coöperates with like plates on the other rods to partially or completely close the opening, and one end of each of the rods is extended beyond the side of the casing and provided with a lever 31, which is connected with a rod 32 whereby all of the damper rods are united and adapted for simultaneous actuation.

One of the levers 31 is bell-cranked, and connected with the second arm of the bell-crank is the stem 33 of a thermostatic device 34, which is so arranged in connection with the cooling device, that varying temperatures or pressures in the tank may act on the device to cause it to actuate the stem 33.

It is apparent that the thermostat may be set for a given temperature, and that when so set, the damper will be operated automatically to admit the required amount of fresh air to maintain the temperature of fluid in the cooling device practically constant.

In order to vary the relative flow of air from the pump to the tank and condenser, I provide the main air pipe 20 and branch 22 with valves 36 and 37, which may be manipulated to admit air to the tank and condenser simultaneously, or to either independently of the other.

In using the device, presuming the parts to be constructed and assembled as described, with the pipes 2—3 connected with the cooling jacket, or the like; when cooling fluid is heated in the jacket, circulation is established through the tank, so that hot fluid from the jacket constantly flows into the tank, and cooler fluid is allowed to pass back from the tank to the jacket. At times the fluid from the jacket becomes so hot that steam is generated and collects in the top of the tank, so that unless some provision is made for relieving the steam and cooling the fluid, the fluid and steam must escape and be lost, or the entire volume of fluid ultimately be transformed into steam.

The forcing of air through the fluid has a cooling effect thereon, but should steam collect in the top of the tank, it enters the pipe leading to the condenser and is conducted thereto and passes through the relatively cool air that is delivered into the condenser from the air pump; the steam passing through the several subchambers of the condenser and through the shower of fresh air in each of said chambers until it has condensed. The fluid of condensation then collects in the well at the bottom of the condenser and is conducted therefrom to the bottom of the tank, where it mingles with and assists in cooling the circulating fluid.

When the engine is first started, the damper opening on the condenser is closed, but should the fluid in the tank become heated to a sufficient degree to affect the thermostat, expansion of the latter operates the damper to open the air port and admit cool air to the pump, which, upon being forced into the tank, cools the circulating fluid to the desired degree.

It is apparent that when the valves in the main air pipe and its branch are both open, air is delivered to the condenser and tank and the cooling action takes place in both simultaneously, and that should a less cooling effect be required, either of the valves may be closed and the cooling be effected in either the tank or condenser alone. Under some conditions no cooling air is required at all, and in that event both of the valves may be closed and the cooling fluid allowed to circulate without the air treatment.

Having thus described my invention, what I claim as new therein, and desire to secure by Letters-Patent, is:—

1. The combination with a tank, of a condenser arranged above the tank, a conduit having an intake portion in the upper part of the tank and leading to one end of the condenser, a pump adapted for inducing a flow of fluid from the condenser and to the lower portion of the tank, and means for supplying fluid to said tank.

2. The combination with a tank, of a condenser, means for conducting fluid from the tank to the condenser, and a pump connected with the condenser and with the tank whereby a continuous circulation of fluid is induced through the condenser and tank.

3. The combination with a tank, of a condenser, means for conducting fluid from the tank to the condenser, a pump connected with the condenser and with the tank whereby a continuous circulation of fluid is induced through the condenser and tank, and means for conducting condensation liquid from the condenser to the tank.

4. The combination with a tank, of a condenser, means for conducting fluid from the tank to the condenser, a pump connected with the condenser and with the tank whereby a continuous circulation of fluid is induced through the condenser and tank, and a by-pass on the conduit leading from the pump to the tank for jetting a portion of the circulating fluid into the condenser.

5. The combination with a tank, of a condenser having an air intake opening, a conduit connecting the tank and condenser, a pump having conduits leading from the condenser and to the tank whereby a continuous circulation of fluid is maintained through the condenser and tank, a damper for controlling the flow of air into the condenser, and a thermostat governed by temperature in the tank and operatively connected with said damper.

6. The combination with a tank, of a supply conduit adapted for delivering fluid to the bottom of the tank, a condenser, a conduit adapted for taking fluid from the top of the tank and delivering same to the condenser, a pump having a conduit leading from the condenser, and a second conduit leading to the bottom of said tank, and a drain pipe leading from the condenser to the tank.

7. The combination with a tank, of a supply conduit adapted for delivering fluid to the bottom of the tank, a condenser, a conduit adapted for taking fluid from the top of the tank and delivering same to the condenser, a pump having a conduit leading from the condenser, a second conduit leading to the bottom of said tank, a drain pipe leading from the condenser to the tank, and a by-pass connecting the second conduit with the tank, said by-pass having branches opening into the condenser for jetting fluid across the path of fluid passing through the condenser.

8. The combination with a tank, of a condenser, a conduit leading from the tank to the condenser whereby steam may flow by its buoyancy from the tank to the condenser, and artificial means for inducing a flow of steam through the condenser and tank and for delivering a cooling medium to the steam flowing in the condenser.

In testimony whereof I affix my signature in presence of two witnesses.

GEORGE L. SCHOFIELD.

Witnesses:
LYNN A. ROBINSON,
LETA E. COATS.